United States Patent [19]
Fisli

[11] 4,274,703
[45] Jun. 23, 1981

[54] HIGH-EFFICIENCY SYMMETRICAL SCANNING OPTICS

[75] Inventor: Tibor Fisli, Los Altos Hills, Calif.

[73] Assignee: Xerox Corporation, Stamford, Conn.

[21] Appl. No.: 88,804

[22] Filed: Oct. 29, 1979

Related U.S. Application Data

[63] Continuation-in-part of Ser. No. 821,006, Aug. 1, 1977, abandoned.

[51] Int. Cl.³ ............................................. G02B 27/17
[52] U.S. Cl. ...................................... 350/6.8; 358/119
[58] Field of Search ............... 350/6.8, 181, 285, 176, 350/175 SL, 190; 356/431, 444; 358/199

[56] References Cited
U.S. PATENT DOCUMENTS

| | | | |
|---|---|---|---|
| 3,675,016 | 7/1972 | Blaidell et al. | 350/6.7 |
| 4,054,360 | 10/1977 | Osaka et al. | 350/6.8 |
| 4,054,361 | 10/1977 | Noguchi | 350/6.8 |
| 4,056,307 | 11/1977 | Rayces | 350/190 |
| 4,116,566 | 9/1978 | Siek | 356/431 |

*Primary Examiner*—John K. Corbin
*Assistant Examiner*—B. W. de los Reyes

[57] ABSTRACT

To provide a relatively compact and linear underfilled multifaceted rotating polygon beam scanning system, there are imaging optics for bringing a input light beam to a tangentially extending line-like focus on successive facets of a rotating polygonal scanning element and for restoring the light beam reflected from the facets to a generally circular focus on an image plane. Each of the facets subtends a sufficient angle about the axis of rotation of the scanner to ensure that the input beam remains fully seated on a single facet while the reflected beam is being scanned through a desired scan angle. Furthermore, improved linearity is achieved because the scanning system is symmetrical in the tangential and sagittal planes at all points between the imaging optics and the polygonal scanning element.

6 Claims, 3 Drawing Figures

HIGH-EFFICIENCY SYMMETRICAL SCANNING OPTICS

CROSS REFERENCE TO RELATED APPLICATION

This application is a continuation-in-part of my copending and commonly assigned U.S. patent application, Ser. No. 821,006, now abandoned, filed Aug. 1, 1977.

BACKGROUND OF THE INVENTION

This invention relates to flying spot optical scanning systems and, more particularly, to optical scanning systems having multi-faceted rotating polygon beam scanning elements.

Multi-faceted rotating polygon beam scanning elements are commonly utilized in flying spot optical scanning systems. For example, they are frequently employed in raster input and output scanners for cyclically scanning an unmodulated or a modulated light beam through a predetermined scan angle in a line scanning direction.

As a general rule, a polygonal scanning element is rotated at an essentially constant angular velocity so that its facets sequentially intercept and reflect an input light beam. To avoid unwanted vignetting of the reflected light beam, provision is conventionally made for preventing the illumination of the active scanning facet from varying as a function of the rotation of the scanning element. To that end, some multi-faceted rotating polygon beam scanners are operated in a so-called overfilled mode in which two or more of the facets are simultaneously illuminated by the input beam. See, for example, U.S. Pat. No. 3,995,110. While overfilled scanners have been used with substantial success, such as in the commercially available 9700 electronic printing system of Xerox Corporation, they suffer from the disadvantage that a substantial part (i.e. 50% or more) of the available optical energy is wasted due to the inherent truncation of the input beam. Thus, others have suggested that such scanners be operated in fully filled mode or underfilled mode to avoid truncating the input beam. However, fully filled systems have tended to be relatively complex because they generally require facet tracking to maintain the input beam fully seated on the scanning facet while the reflected beam is being scanned through a desired scan angle. Underfilled systems, on the other hand, have traditionally been rather bulky and non-linear. See, for example, U.S. Pat. Nos. 3,675,016 and 3,750,189.

SUMMARY OF THE INVENTION

In accordance with the present invention, to provide a relatively compact and linear underfilled multi-faceted rotating polygon beam scanning system, there are imaging optics for sequentially bringing an input light beam to a tangentially extending line-like focus on successive facets of a rotating polygonal scanning element and for restoring the light beam reflected from the facets to a more circular focus on an image plane to provide a generally circular scanning spot. Each of the facets subtends a sufficient angle about the axis of rotation of the scanning element to ensure that the input beam remains fully seated on a single facet while the reflected beam is being scanned through a desired scan angle. Furthermore, improved linearity is achieved because the scanning system is symmetrical in the tangential and sagittal planes at all points between the imaging optics and the scanning element.

More particularly, to perform a relatively linear wide angle scan over a flat field, the imaging optics comprise a spherical focusing lens and at least one cylinderical sagittal correction lens. The sperical lens is positioned between the scanning element and the cylinderical lens or lenses and is used in a symmetrical double pass mode to focus the input and reflected beams. The curvature of the spherical lens is selected to compensate for the tendency of the scanning spot velocity to vary as a function of the field position. A single cylinderical sagittal correction lens may be used in a symmetrical double pass mode for both input and reflected beams if the sagittal angular displacement between those beams is less than 5° or so. If the displacement angle substantially exceeds that limit, the cost of avoiding excessive aberrations while using a single cylinderical lens is likely to be prohibitive. Thus, the preferred approach for systems involving a relatively large sagittal angular displacement between the input and reflected beams is to provide separate, substantially identical and symmetrically positioned, cylinderical sagittal correction lenses for the input and reflected beams. At any rate, the cylinderical correction lens for the reflected beam is selected to have a radius of curvature in the tangential plane which causes that lens to be substantially normal to the reflected beam in all field positions.

To compensate for radial runout variations in the polygonal scanning element, the input beam is preferably substantially collimated in the tangential plane while being applied thereto. For that reason, there advantageously is a prefocusing lens for bringing the input beam to a focus at a point which is displaced from the imaging optics by a distance selected to cause such collimation.

BRIEF DESCRIPTION OF THE DRAWINGS

Still other objects and advantages of the invention will become apparent when the following detailed description is read in conjunction with the attached drawings, in which.

DETAILED DESCRIPTION OF THE ILLUSTRATED EMBODIMENTS

While the invention is described in some detail hereinbelow with specific reference to certain illustrated embodiments, it is to be understood that there is no desire to limit it to those embodiments. On the contrary, the intent is to cover all modifications, alternatives, and equivalents falling within the spirit and scope of the invention as defined by the appended claims.

Figure 1:
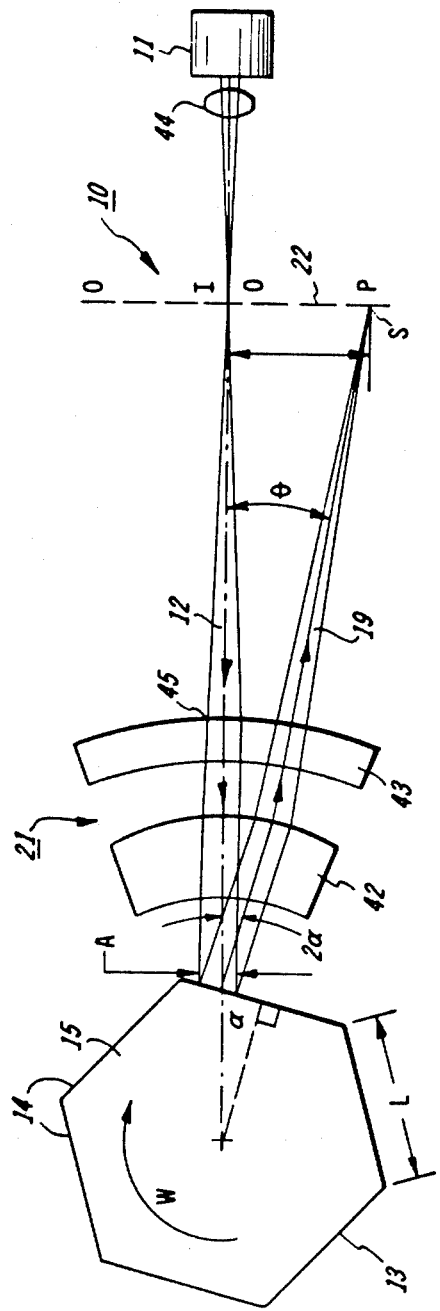
FIG. 1 is a schematic tangential plane view of an underfilled multi-faceted rotating polygonal beam scanning system which is constructed in accordance with the present invention.
Figure 2:
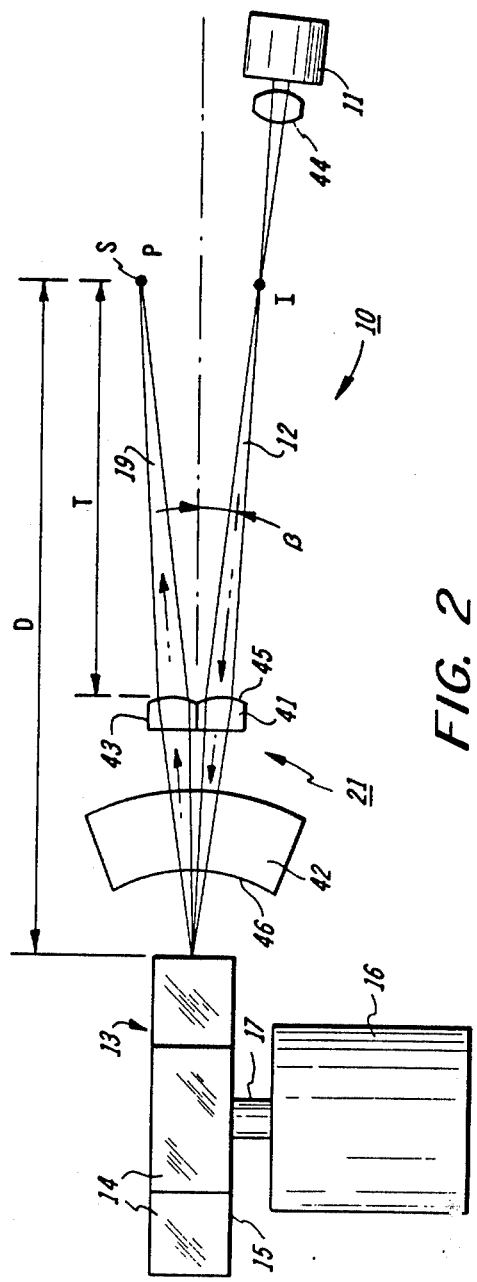
FIG. 2 is a schematic sagittal plane view of the scanning system shown in FIG. 1.

Turning now to the drawings, and at this point especially to FIGS. 1 and 2, there is an optical scanning system 10 comprising a laser or other suitable source 11 for supplying an input light beam 12 which is applied to a multi-faceted polygonal beam scanning element 13 having a plurality of substantially identical reflective facets 14. In keeping with generally accepted practices, the facets 14 are essentially planar and are supported in adjacent abutting relationship on the outer circumference of a regular polygon 15. Furthermore, a motor 16 has its output shaft 17 coupled to the polygon 15 for rotating the scanning element 13 a substantially constant angular velocity ω in the direction of the arrow (FIG. 1). Thus, the facets 14 sequentially intercept and reflect the input beam 12, thereby providing a reflected light beam 19 which is cyclically scanned through a predetermined scan angle θ.

In accordance with this invention, there are imaging optics 21 for serially focusing the input beam 12 on successive ones of the facets 14 and for refocusing the reflected beam 19 on an image plane 22 to provide a scanning spot S. As shown, the input beam 12 is applied to the imaging optics 21 in alignment with the optical axis thereof in the tangential plane (FIG. 1) and at a small predetermined angle β with respect to that axis in the sagittal plane (FIG. 2). Hence, the optical paths for the input and reflected beams 12 and 19, respectively, are symmetrical in the tangential and sagittal planes about the optical axis of the imaging optics 21 at all points between the scanning element 13 and the imaging optics 21.

As is known, the polygonal scanning element 13 is theoretically capable of cyclically scanning the reflected light beam 19 through an angle, ψ, which is given by:

$$\psi = \frac{2(360°)}{N} \quad (1)$$

where N = the number of facets 14 on the scanning element 13

In keeping with the practice used hereinbelow of referencing all angles of interest to the optical axis of the imaging optics 21, the theoretical limit may be expressed in terms of a half angle as follows:

$$\psi/2 = \pm 360°/N \quad (2)$$

Since the scanner 13 is operating in an underfilled mode, the maximum permissible half scan angle α can only approach the theoretical limit ψ/2. In other words, there is the overriding requirement that the input beam 12 must remain fully seated on just one of the facets 14 (i.e., the active facet) while the reflected beam 19 is scanned through a desired scan angle. For that reason, the maximum permissible half scan angle α is limited so that:

$$A \leq 2r\left(\tan\frac{\psi}{4} - \tan\frac{\alpha}{2}\right) \quad (3)$$

where A = the tangential width of the aperture illuminated by the fully seated input beam 12; and
r = the radius of the scanning element 13 as measured perpendicularly to the facets 14.

Solving equation (3) for the maximum half scan angle α which is consistent with underfilled operation of the scanner 13 yields:

$$\alpha_{max} = 2 \arctan\left(\tan\frac{\psi}{4} - \frac{A}{2r}\right) \quad (4)$$

Thus, the maximum permissible full field scan angle is:

$$2\alpha_{max} = 4 \arctan\left(\tan\frac{\psi}{4} - \frac{A}{2r}\right) \quad (5)$$

It can be shown that the scanning system 10 provides a substantially linear scan of the scanning spot S over a flat field of scan if the imaging optics 21 have a symmetrical negative distortion factor, $d_i$, which varies as a function of the instantaneous half field angle $\theta_i$ in accordance with the following relationship:

$$d_i = \theta_{ri}/\tan\theta_i \quad (6)$$

where $\theta_{ri}$ = the instantaneous angle of the reflected beam 19 relative to the optical axis of the imaging optics 21 in radians; and
$\theta_i$ = the instantaneous angle of the reflected beam 19 relative to the optical axis of the imaging optics 21 in degrees Multiplying equation (4) by equation (6) and using the limiting case to determine the maximum actual half field scan angle, $\theta_{max}$, which can be realized while operating the scanning system 10 in an underfilled mode to achieve a substantially linear, flat field scan of the scanning spot S yields:

$$\theta_{max} = 2d_{max} \arctan\left(\tan\frac{\psi}{4} - \frac{A}{2r}\right) \quad (7)$$

That, of course, means that the maximum actual full field scan angle is:

$$2\theta_{max} = 4d_{max} \arctan\left(\tan\frac{\psi}{4} - \frac{A}{2r}\right) \quad (8)$$

An example may add some perspective to the foregoing discussion. For purposes of this example, it will be assumed that the scanning system 10 is being used to cyclically scan the reflected beam 19 along an 11" scan line on the image plane 22 and that the optical path length, D, for the reflected beam 19 (as measured on the optical axis, from the active facet 14 to the image plane 22) is 15". That means that an actual half scan angle $\theta_{max}$ of the slightly over 20° is required. Referring to equation (6), it will be seen that a maximum negative distortion factor $d_{max}$ of approximately 0.95 radians/degree is needed to achieve a linear scan of the scanning spot S. Therefore, the maximum permissible half scan angle $\alpha_{max}$ need only be slightly greater than 21°. If $\alpha_{max}$ is conservatively selected to be 22° and if the scanning element 13 is selected to have fourteen facets 14 and a radius r of 1.643", equation (3) can be solved to show that the tangential width A for the aperture illuminated by the fully seated input beam 12 must be less than about 0.100". Hence, a conservative specification would limit the tangential width A of the illuminated aperture to 0.110" as measured with the illuminated aperture normal to the input beam 12. That would provide a safety margin of about 10 percent to accomodate any minor variations in the tangential width A of the illuminated aperture as a function of the rotation of the scanning element 13. In practice, the image plane 22 is typically advanced in a cross scan direction at a rate of, say, 10 inches/second relative to the scanning element 13. Hence if it is assumed that a scanning density of 350 scan lines/inch is desired, the rotational rate required of the scanning element 13 would be 15,000 RPM. Clearly, the foregoing parameters are well within reasonable boundaries in view of the current state of the art.

Some scanning efficiency is necessarily sacrificed in the interest of operating the scanning system 10 in an underfilled mode. As a general rule, however, there is only a minor reduction in scanning efficiency which is far outweighed by the advantages of the underfilled mode of operation. For instance, in the case of the above-described example, the scanning efficiency is:

$$E = \frac{\text{Maximum permissible scan angle}}{\text{Theoretical Limit}} = \frac{2\alpha_{max}}{\psi} = 85\% \quad (9)$$

Considering the imaging optics 21 in some additional detail, it will be seen that there are symmetrically positioned and optically matched lenses 41–43 for focusing the input beam 12 on the active facet 14 and for focusing the reflected beam 19 on the image plane 22. More particularly, as shown in FIGS. 1 and 2, there is a cylinderical sagittal correction lens 41 and a spherical focusing lens 42 for bringing the input beam 12 to a tangentially extending line-like focus on the active facet 14. To restore the reflected beam 19 to a more circular focus on the image plane 22, there is the spherical lens 42 and another cylinderical sagittal correction lens 43. Accordingly, it will be understood that the spherical lens 42 is used in a symmetrical double pass mode to accomodate the input and reflected beams 12 and 19, respectively. Of course, the number of elements required to form the spherical lens 42 is directly dependent on the size of the scan angle $\theta$ which, in turn, is dependent on the ratio of the scan line length PQ to the output optical arm length D. The cylinderical lenses 41 and 43, on the other hand, are optically matched to each other and are substantially identically positioned relative to the spherical lens 42 in the optical paths for the input beam 12 and the reflected beam 19, respectively.

To bring the input beam 12 to a tangentially extending line-like focus and to restore the reflected beam 19 to a generally cicular focus, the cylinderical correction lenses 41 and 43 have substantial power in the sagittal plane but little, if any, power in the tangential plane. Indeed, there preferably is a prefocusing lens 44 for initially focusing the input beam 12 at a point I which is displaced from the active scanning facet 14 by a distance which is approximately equal to the output optical arm length D. In other words, the prefocal point I for the input beam 12 is the conjugate to the midpoint O of the scan line POQ which is traced out on the image plane 22 by the reflected beam 19. As a result of the prefocusing, the input beam 12 is substantially collimated in the tangential plane as it leaves the last surface 46 of the spherical lens 42, whereby the size and shape of the scanning spot S are substantially unaffected by any minor radial runout variations in the scanning element 13.

Since the input beam 12 is brought to a tangentially extending line-like focus on successive ones of the facets 14, the size and shape of the scanning spot S are also substantially unaffected by any sagittal plane variations in the power of the facets 14. Power variations among the facets 14 in the tangential plane 14 will have some effect on the geometry of the scanning spot S, but not nearly so great an effect as in an overfilled system. More pointedly, returning for a moment to the foregoing example, it can be shown that each facet 14 of the scanner 13 has a tangential length, L, of approximately 0.75" if the scanner 13 has fourteen facets 14 and a radius r of 1.643" as previously assumed. Thus, the tangential width A of the aperture illuminated by the input beam 12 (which was assumed to be about 0.100") is slightly less than 1/7 of the facet length L. If, it is now assumed that the total power variation along each facet 14 is $\frac{1}{4}\lambda$, where $\lambda$ is the wavelength of the input beam 12, the power variation within the illuminated aperture is approximately:

$$\tfrac{1}{4}\lambda \div 7.5 = \lambda/30 \quad (10)$$

That is about 1/12 the effect that the same facet power variation would have in an overfilled system.

As will be appreciated, the cylinderical correction len 43 compensates for any slight tilt or wobble of the scanning element 13 and for any minor tilt angles or coning errors of the facets 14. In effect, the cylinderical lens 43 bends the reflected beam 19 back toward a predetermined sagittal projection plane should the reflected beam 19 tend to wonder therefrom. Consequently, the sagittal position of the focused reflected beam 19 remains substantially constant on the image plane 22. To provide precise sagittal correction, the optical axes of the cylinderical lenses 41 and 43 are equally but oppositely displaced from the optical axis of the imaging optics 21 by the aforementioned sagittal plane projection angle $\beta$.

Figure 3:
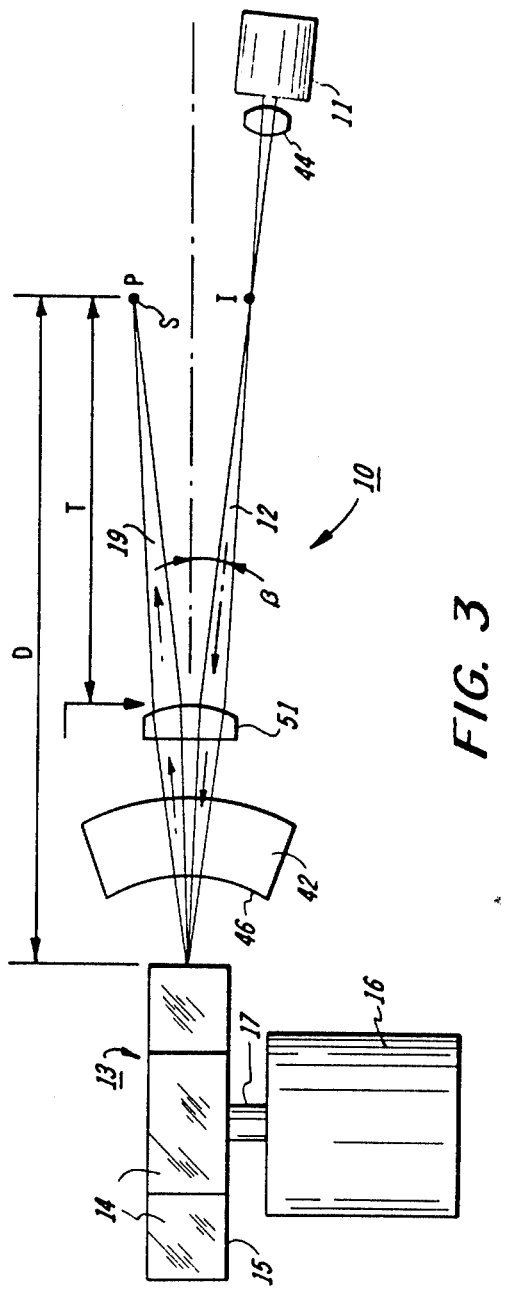
FIG. 3 is a schematic sagittal plane view of an alternative embodiment of this invention.

As shown in FIG. 3, if the angular displacement between the input and output beams 12 and 19 (i.e., $2\beta$) is less than 5° or so, the cylindrical lenses 41 and 43 may be replaced in favor of using a, single cylindrical sagittal correction lens 51 in a symmetrical double pass mode to accomodate both the input beam 12 and the reflected beam 19. If a single sagittal correction lens is used in scanners having larger displacement angles between the input and output beams, excessive optical aberrations are likely to occur.

In keeping with one of the important features of this invention, the cylindrical lens 43 and 51 have a bending radius in the tangential plane which is selected to maintain the reflected beam 19 in focus over a flat field of scan POQ on the image plane 22. Consequently, the reflected beam 19 is more or less normal to the cylindrical lenses 43 and 51 in all field positions $\theta_i$.

Furthermore, in accordance with another important aspect of this invention, the tangential position, $X_i$, of the scanning spot S is controlled as a function of the field angle $\theta_i$ so that a substantially linear, flat field scan of the scanning spot S is achieved. For a flat field of scan, the uncontrolled tangential position, $X'_i$, of the scanning spot S is given by:

$$X'_i = D \tan \theta_i \quad (11)$$

In contrast, for a linear scan of the scanning spot S, the scanning system must obey the equation:

$$X_i = D \theta_{ri} \quad (12)$$

Therefore, the spherical lens 42 and the cylindrical lens 43 or 51 are selected to provide a net symmetrical non-linear negative distortion factor which is given by:

$$d_i = \theta_{ri}/\tan \theta_i \quad (13)$$

The resolving power or resolution capability of the scanning system 10, is a function of the size of the scanning spot S. Spot size is defined by the expression:

$$\text{Spot size} = k \ F\# \quad (14)$$

where $k\lambda$ = a constant which is dependent on whether the scanning system 10 is diffraction limited or not;

$\lambda$ = the output wavelength of light source 11; and $F\#$ = the F/Number of the scanning system 10

The constant, k, is minimized if the scanning system 10 is diffraction limited. Indeed, the theoretical untruncated diffraction limited value of k is 1.27, although conservation optical design practices suggest that a more realistic value for a diffraction limited system having normal optical abberations, such as may be caused by fabrication and assembly errors, is k=1.60 or so. Of course, the scanning system 10 is diffraction limited only if the F# is selected so that the input beam 12 and the reflected beam 19 are untruncated. Thus, it should be noted that when the prefocussing lens 44 is used, the F# of the scanning system 10 is defined in both meridians (i.e., for the input beam 12 and the reflected beam 19) by the expression:

$$F\# = a/T \quad (15)$$

where a = the cone diameter of the beams 12 or 19 as measured at the first surface 45 of the imaging optics 21; and T = the distance from the surface 45 to the image plane 22, as measured along the optical axis of the imaging optics 21

As will be appreciated, the cone diameter a and, therefore, the F# may be controlled by increasing or decreasing the output focal length of the prefocussing lens 44 while adjusting its position relative to the laser 11 so that the input beam 12 remains prefocussed at point I. Sophisticated optical design techniques might enable the scanning system 10 to be diffraction limited at a F# as low as F/20. However, straightforward optical design practices may be used to provide for diffraction limited operation down to F/50 or so, which is more than adequate for most practical applications.

CONCLUSION

In view of the foregoing, it will now be evident that the present invention provides a compact and optically efficient scanning system which is capable of providing a substantially linear, flat field scan of a scanning spot. The scanning system is capable of providing a relatively wide scan angle. Indeed, the ration of the scan line length POQ to the output optical arm length D may be greater than one. Additionally, it will be understood that provision is made in the scanning system of this invention to minimize variations in the size of the scanning spot. Furthermore, the scanning system may easily be diffraction limited at almost any F# needed for practical applications, thereby minimizing the size of the scanning spot in the interest of maximizing the available optical resolution.

Preferably, the scanning system of this invention is symmetrically implemented. However, it will be evident that certain aspects of the invention are not dependent on the symmetry. For example, the concept of using a single spherical lens in a double pass mode can be applied to both symmetrical and asymmetrical multifaceted rotating polygon beam scanning systems and to scanning systems which use a rotating monogon or an oscillating mirror for beam scanning purposes.

What is claimed is:

1. A flying spot optical scanning system for sweeping an optical scanning spot across an imaging surface, said system comprising the combination of
   a source for supplying a light beam
   a beam scanning element having a plurality of reflective facets circumferentially distributed in a tangential plane about an axis of rotation;
   means for rotating said scanning element on said axis of rotation, whereby said facets serially intercept and reflect said light beam;
   lens means optically interposed between said source and said surface for serially focusing the light beam onto successive ones of said facets and for refocusing light reflected from said facets onto said surface, said lens means being substantially symmetrical about an optical axis which is essentially normal to said axis of rotation, said light beam underfilling and remaining fully seated on the facet upon which it is focused while the reflected light is scanned through a predetermined scan angle.

2. The flying spot scanning system of claim 1 wherein said lens means comprises a spherical lens which is substantially symmetrical about said optical axis, whereby said spherical lens operates in a symmetrical double pass mode to participate in focusing said light beam on said facet and in refocusing said reflected light onto said surface.

3. The flying spot scanning system of claim 2 wherein said lens means additionally comprises a cylinderical sagittal correction lens which is also substantially symmetrical about said optical axis, said spherical lens is positioned between said cylinderical lens and said scanning element, said light beam is applied to said cylinderical lens with a generally circular cross section, and said cylinderical lens has substantial power in a sagittal plane and negligible power in said tangential plane, whereby said cylinderical and spherical lenses operate in symmetrical double pass modes to serially bring said light beam to a tangentially extending line-like focus on said successive facets and to restore the light reflected from said facets to a generally circular focus on said surface.

4. The flying spot scanning system of claim 3 further including a prefocusing lens optically aligned between said source and said cylinderical lens for bringing said light beam to a focus at a point selected to cause said light beam to be substantially collimated in said tangential plane while being applied to said facets, thereby compensating for radial runout variations of said scanning element.

5. The flying spot scanning system of claim 2 wherein said lens means additionally comprises a pair of substantially identical cylinderical sagittal correction lens which are approximately equidistantly spaced from said spherical lens and substantially symmetrically positioned on opposite sides of said optical axis in a sagittal plane, said spherical lens is positioned between said cylinderical lenses and said scanning element, each of said cylinderical lenses has substantial power in said sagittal plane and negligible power in said tangential plane, and said light beam is applied to one of said cylinderical lenses with a substantially circular cross-sectional shape, whereby said one cylinderical lens and said spherical lens cooperate in bringing said light beam to a tangentially extending line-like focus on said successive facets, and the other cylinderical lens and said spherical lens cooperate in restoring said reflected light to a generally circular focus on said surface.

6. The flying spot scanning system of claim 5 further including a prefocusing lens optically aligned between said source and said one cylinderical lens for bringing said light beam to a focus at a point selected to cause said light beam to be substantially collimated in said tangential plane while being applied to said facets, thereby compensating for radial runout variations of said scanning element.

* * * * *